United States Patent [19]

Ramerth

[11] Patent Number: 5,320,282

[45] Date of Patent: Jun. 14, 1994

[54] AERIAL SPRAYER

[76] Inventor: Frederick J. Ramerth, RR 1, Box 164, Dundee, Minn. 56126

[21] Appl. No.: 30,774

[22] Filed: Mar. 12, 1993

[51] Int. Cl.$^5$ ............................................. B64D 1/18
[52] U.S. Cl. .................................... 239/171; 244/136
[58] Field of Search ......................... 239/171; 244/136

[56] References Cited

U.S. PATENT DOCUMENTS

| 3,084,890 | 4/1963 | Hyde | 239/171 |
| 3,494,423 | 2/1970 | Stansbury et al. | 239/171 |
| 3,523,646 | 8/1970 | Waldrum | 239/171 |
| 4,231,520 | 11/1980 | Waldrum | 239/171 |
| 4,824,024 | 4/1989 | Bishop et al. | 239/171 |
| 5,025,988 | 6/1991 | Lund | 239/171 |
| 5,110,048 | 5/1992 | Waldrum | 239/171 |

Primary Examiner—Karen B. Merritt

[57] ABSTRACT

A system for aerial spraying of agricultural crops or the like in which droplets of a controlled size are formed and discharged onto the ground instead of a fine spray. A system is provided for reducing pressure before delivery of the liquid to the discharge nozzles. The nozzles are directed so that the droplets are impelled by the air stream from the upper part of the nozzle structure and are then affected by the air stream and gravity in furtherance of the desire for droplets rather than micron-sized spray mists which too readily drift away from the desired area to be covered.

6

AERIAL SPRAYER

BACKGROUND AND SUMMARY OF THE INVENTION

This invention pertains to aerial spraying of agricultural crops and more specifically to a system adapted to deliver liquid insecticide or herbicide to the crops in a more uniform manner with less likelihood of drift than was formerly possible.

Aerial spraying of crops either by helicopter or spray plane has been fairly common. In most spraying systems, the material is fed from a manifold into nozzles which are designed hydraulically to break the material into a fairly fine spray which then falls onto the crop.

The use of a spray of this type requires that the material be applied on relatively calm days. Wind will cause considerable drift of the material. Use of pesticides becomes impossible on days with any appreciable wind which might cause the pesticide material to drift onto adjacent fields. Such drift of crop specific pesticides—those which are adapted to kill broad leaved plants but not corn, for example—may readily severely damage adjacent fields of soybeans or other crops having broad leaved plants.

Sprays may also be affected by small areas of thermal up draft or down draft which tend to cause an irregular distribution with undesirable areas of thin or thick application.

By use of the described invention, the discharge of the material in droplets as opposed to mist results in more even distribution over the expanse of the field and less drift of the material making possible reduced potential for damage.

DESCRIPTION

Figure 1:
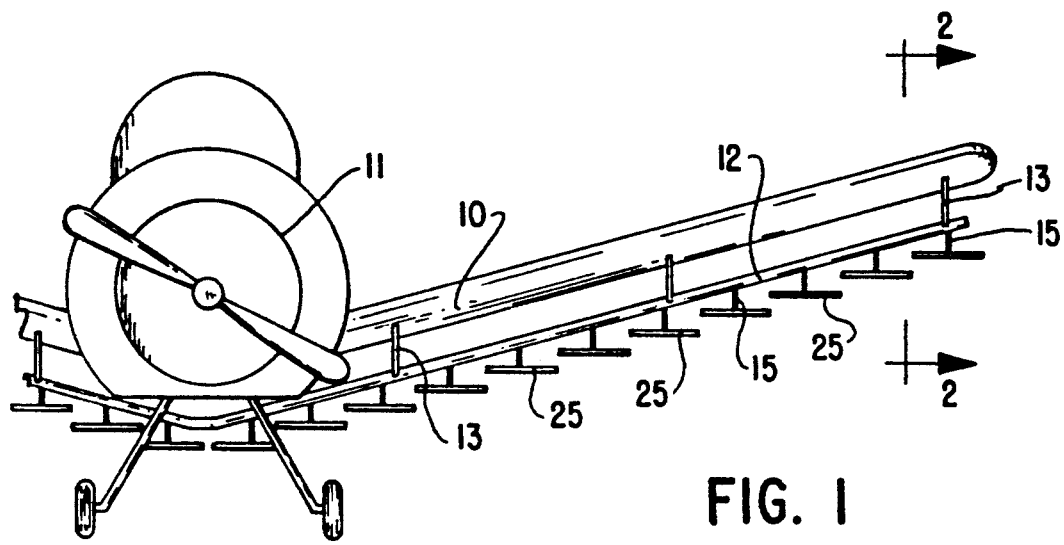
FIG. 1 is a front elevational view of a spray plane with the dihedral of the wings exaggerated showing the system in place.
Figure 2:
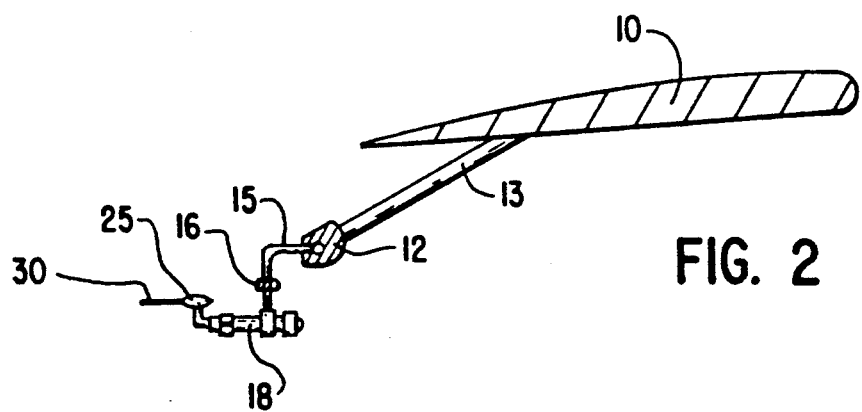
FIG. 2 is a sectional view from line 2—2 of FIG. 1.

Briefly this invention comprises a new, more efficient system for distributing a crop spray to a crop by means of an aerial sprayer. More specifically and referring to the drawings, the system is adapted to be mounted on the wing 10 of a spray plane 11. It may also be used on a helicopter by mounting a boom on brackets from the body of the copter.

On the spray plane, a manifold 12 is mounted by means of brackets 13 to the wing 10. On a helicopter, the manifold would be a boom mounted on the body. In either case, the pesticide material would be fed to the manifold from a central position in a manner well known in the art.

From the manifold 12, the material flows through a pipe 15 which may be divided and joined by a pipe union 16 for ease of removal to repair, replace or clean the spraying device beyond the pipe 15. The spraying device includes a common spray head 18 which includes a pressure "pop-off" valve 19 which will relieve the pressure in the line as soon as it exceeds a fixed value, and an orifice holding part 20. An orifice plate 21 in the part 20 allows a limited flow of material to the exit 22 of the head 18.

Figure 3:
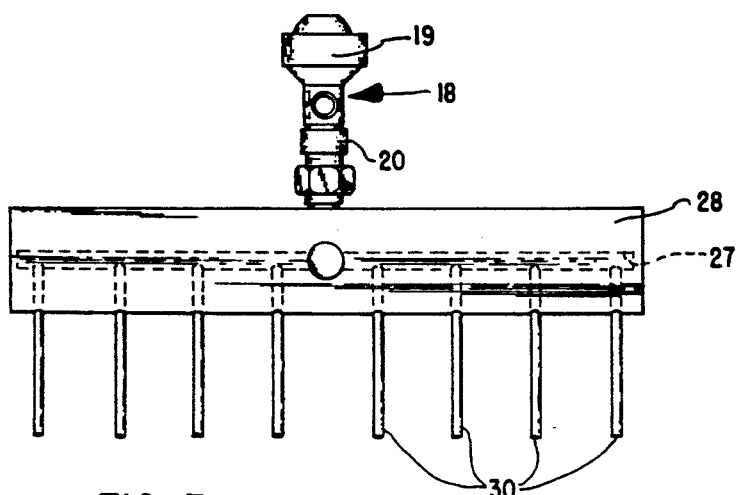
FIG. 3 is a top plan view of the rake and nozzles of the system.
Figure 4:
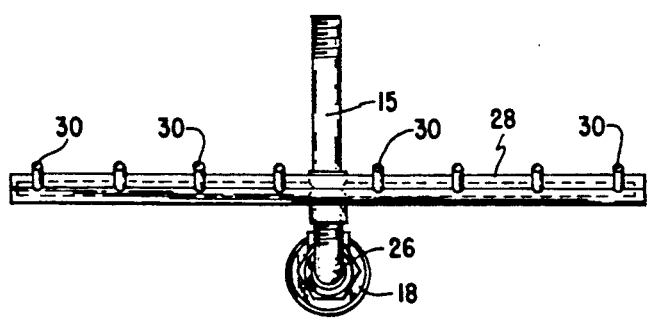
FIG. 4 is a front elevational view of the parts shown in FIG. 3.
Figure 5:
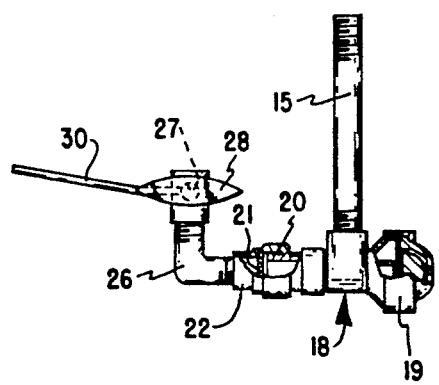
FIG. 5 is a side elevational view of the parts shown in FIG. 4 with part of the delivery fitting broken away to show underlying parts.

Instead of a spray nozzle in this device, a spray rake 25 is attached to the exit 22. This rake is best shown in FIGS. 3-5, and includes a connecting pipe elbow 26 which receives spray of material from the exit 22 and delivers it divertly and without further obstruction to a manifold chamber 27 in a streamlined rake spine 28. The chamber 27 extends completely across the spine, but is sealed at the ends.

Material is discharged from the chamber through teeth 30 in the form of tubes extending from the chamber 27 toward the rear of the aircraft. The teeth must slant upward to the rear at an angle of approximately 5-10 degrees for beet operation of the device.

In operation, the spray plane is flown and supplied with material in a normal way. Spray material is supplied to the rake spine 28 as though each one were a spray nozzle. It should be noted that the quantity supplied to each rake is similar to that which would be normally supplied to a nozzle. However, by using a plurality of teeth 30 (I prefer six to ten, and have found that eight is the most satisfactory) the pressure on the chamber 27 is kept low. The material then is moved out through the teeth in liquid droplets instead of as a spray. By angling the teeth 30 upward into the air stream, the flow of air over the tips of the teeth creates enough of a vacuum that the material is pulled from the top of each tooth. The combination of the material being pulled from the top of the tooth and the action of gravity forms droplets of material rather than a spray mist. This appears to provide a more appropriate size of droplet so that distribution of the material on the area sprayed is more appropriate.

Tests of the device have been conducted by spreading sheets of absorbent paper on a surface similar to that which might be sprayed. Flights were then made across the surface with various configurations of nozzles, rakes, speeds of flight, cross wind velocity and the like. The results of the test provide conclusively, especially when cross winds or even head or following winds were above about three miles per hour, that the use of rakes provide for more even distribution of material on the absorbent paper. It was also evident visually that much less of the material drifted as spray when the rakes were used. The conclusions were not substantially different at various speeds of flight with a spray plane. Applicant believes these results can be extrapolated to helicopter flight since forward speeds are not substantially different. It may be that the down draft from a helicopter rotor would be more directive of spray than is the wind of the plane. However, that feature would similarly affect the droplets produced in the present device.

It may be noted that the favored embodiment of the invention uses a plurality of rakes rather than a single long boom. The original reason was one of practicality. It was simply easier to mount each rake on a nozzle attachment. However, it has been discovered that mounting each rake in a near horizontal position, rather than following the dihedral of the wing results in more even distribution of material. (The dihedral angle is exaggerated in FIG. 1 to show the difference between that angle and the horizontal disposition of the rakes.)

Also, in case of breakage, the replacement of one small rake is less expensive than replacing a full boom.

It is thus clear that by this invention a more efficient and more even distribution of spray material is possible by means economical to build and to repair.

I claim:

1. A system of applying pesticides to fields comprising an aircraft having a body and adapted to fly in a substantially horizontal course over said fields, said body having a longitudinal axis, boom means extending laterally from said body including a manifold adapted to receive spray material, said manifold having a plurality of exits therefrom, distribution means attached to said manifold at each of said exits to receive said spray material, said distribution means including tubular teeth each having a discharge end from which said spray material is discharged into ambient air flow, said teeth each having a longitudinal axis extending substantially parallel to said longitudinal axis of said body and said teeth being spaced from one another in a direction substantially perpendicular to said longitudinal axis of said body and being sloped upward toward their discharge end whereby the discharge end of said teeth creates a vacuum as said aircraft flies to cause said spray material to flow from said discharge end in droplets.

2. The systems of claim 1 in which the upward slope of said teeth is of the order of five degrees.

3. The system of claim 1 in which said distribution means includes a plurality of rakes composed of said teeth attached to a spine, each of said rakes being attached directly and without obstruction to said manifold at one of said exits.

4. The system of claim 3 in which each spine is formed to provide a chamber to receive spray material from said manifold and said tubular teeth are in communication with said chamber whereby said spray material will flow from said chamber through said tubular teeth.

5. The system of claim 1 in which said aircraft is an airplane having wings, said boom means being attached to the underside of said wings.

6. The system of claim 5 in which each of said wings has a trailing edge, said boom means being attached to said wings beneath and behind said trailing edges.

* * * * *